(12) United States Patent  
Simpson

(10) Patent No.: US 7,469,280 B2  
(45) Date of Patent: Dec. 23, 2008

(54) COMPUTER IMPLEMENTED SYSTEM AND METHOD FOR PREDICTIVE MANAGEMENT OF ELECTRONIC MESSAGES

(75) Inventor: Nigel Simpson, Bainbridge Island, WA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1145 days.

(21) Appl. No.: 10/287,992

(22) Filed: Nov. 4, 2002

(65) Prior Publication Data

US 2004/0088359 A1    May 6, 2004

(51) Int. Cl.
*G06F 15/173* (2006.01)
(52) U.S. Cl. .................. 709/223; 709/203; 709/206; 709/224; 379/88.22; 379/93.24; 379/100.08
(58) Field of Classification Search ............. 709/206, 709/203, 217, 219, 223, 224; 379/88.22, 379/93.24, 100.08
See application file for complete search history.

(56) References Cited

U.S. PATENT DOCUMENTS

| | | | | |
|---|---|---|---|---|
| 5,613,108 A | * | 3/1997 | Morikawa ................. | 707/200 |
| 5,619,648 A | * | 4/1997 | Canale et al. ............. | 709/206 |
| 5,802,253 A | * | 9/1998 | Gross et al. ............... | 706/47 |
| 5,917,489 A | * | 6/1999 | Thurlow et al. ........... | 715/809 |
| 6,057,841 A | * | 5/2000 | Thurlow et al. ........... | 715/809 |
| 6,092,101 A | * | 7/2000 | Birrell et al. .............. | 709/206 |
| 6,182,118 B1 | * | 1/2001 | Finney et al. ............. | 709/206 |
| 6,484,196 B1 | * | 11/2002 | Maurille ................... | 709/206 |
| 6,779,118 B1 | * | 8/2004 | Ikudome et al. ........... | 726/7 |
| 6,842,775 B1 | * | 1/2005 | Chastain et al. ........... | 709/207 |
| 6,941,466 B2 | * | 9/2005 | Mastrianni ................ | 726/22 |
| 7,200,636 B2 | * | 4/2007 | Harding .................... | 709/206 |
| 2002/0174020 A1 | * | 11/2002 | Grey et al. ................. | 705/26 |
| 2003/0163537 A1 | * | 8/2003 | Rohall et al. .............. | 709/206 |
| 2003/0187937 A1 | * | 10/2003 | Yao et al. ................... | 709/206 |
| 2003/0233415 A1 | * | 12/2003 | Beyda ....................... | 709/206 |
| 2003/0233418 A1 | * | 12/2003 | Goldman ................... | 709/206 |

* cited by examiner

*Primary Examiner*—Lashonda T Jacobs
(74) *Attorney, Agent, or Firm*—Osha • Liang LLP

(57) ABSTRACT

A computer implemented method and system for filtering incoming electronic messages based on user objectives is disclosed. For example, automated assistance can be provided in realizing a user objective of filtering electronic mail (e-mail) messages associated with a "conversation" thread. The electronic message filtering system can receive an e-mail message, examine attributes or characteristics of the e-mail message, determine if a rule has been established for messages with the characteristics of the incoming message, and if there has been a rule set up, automatically implement an action in accordance with the rule. For example, when electronic messages with particular information in the header (e.g., a particular subject) are received, the messages are automatically moved to a designated trash folder. Additionally, finer granularity of message management can be achieved (e.g., an action is automatically implemented to display a message from a particular sender at the top of a list).

12 Claims, 14 Drawing Sheets

310A

| Subject: | Get Rich Quick!! 201 |
|---|---|
| From: | xxx@isp.com 202 |
| TO: | Johndoe@isp.com 203 |

E-mail Text Body
204

Subject: Get Rich Fast!! 201
From: xxx@isp.com 202
TO: Johndoe@isp.com 203

E-mail Text Body
204

| In Box | FROM | Subject | Date | |
|---|---|---|---|---|
| | 201 | 202 | 203 | |
| xxxxxxxxx | xxx@isp.com | GET RICH QUICK!! | 2-1-00 | 401 |
| xxxxxxxxx | xxx@isp.com | GET RICH FAST!! | 2-1-00 | 402 |
| xxxxxxxxx | mom@isp.com | Hello | 2-1-00 | 403 |
| xxxxxxxxx | coworker@work.com | Macintosh networking | 2-1-00 | 404 |

Subject: Get Rich Fast!! 201
From: xxx@isp.com 202
TO: Johndoe@isp.com 203

E-mail Text Body

Figure 4

Rule Database

Rule 1 definition
Rule 2 definition
Rule 3 definition

Figure 7

COMPUTER IMPLEMENTED SYSTEM AND METHOD FOR PREDICTIVE MANAGEMENT OF ELECTRONIC MESSAGES

BACKGROUND OF THE INVENTION

1. Field of the Invention

The present invention relates to the field of data processing. More specifically, embodiments of the present invention relate to a computer implemented method and system for managing electronic messages.

2. Related Art

Electronic systems and circuits have made a significant contribution towards the advancement of modem society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. These advantageous results are often realized through networked devices that enable information to be communicated between the devices. As organizations and individuals utilize increasingly distributed and open communication environments, the use of electronic messaging has increased substantially and become an important method of communication for many individuals and organizations. However, users often do not want to read many of the messages and while e-mail has provided the average user with a convenient and rapid communication method, it has also often burdened users with arduous and frustrating message management problems such as handling unwanted e-mail.

Electronic mail (E-mail) provides a convenient and easy means for two or more individuals to communicate information in text messages, pictures, or almost any electronic file. The information is often communicated via e-mail mailing list mechanisms utilized to facilitate participation by large groups of users having something in common such as interest in a general subject. Mailing list activity can be extremely high, often depending on the number of users on the list and the nature of the e-mail discussion. Mailing list communications are usually organized in "conversation" threads. A conversation thread is typically a sequence of messages, usually involving responses to an initial message posting. Organizing related e-mails in a thread typically helps a user to follow or join an individual discussion in a newsgroup or mailing list from among many different discussions that may exist.

The typical high volume of e-mail messages usually requires a significant expenditure of resources managing the e-mails. Most e-mail messages are stored by default in a single electronic mailbox or folder until the recipient of the e-mail processes them individually. When the number of incoming messages is very large, the process of manually determining an appropriate e-mail management action (e.g., opening or deleting an e-mail) consumes significant time and resources. Some traditional e-mail applications may attempt to allow a user to direct the software to perform actions on particular types of e-mail by defining rules that filter messages. However, developing these rules and associated sequence of computer instructions or code typically consumes a lot of time and resources as users engage in several iterative rule definition and test cycles involving Boolean logic. These coding and testing steps often take significant time to make sure that the code (rules) is (are) behaving correctly and is not inadvertently producing detrimental results such as inappropriately deleting messages.

Traditional attempts at simplifying e-mail management are usually very limited in scope and user objectives are often not satisfied. For example, users often desire to "filter" out undesirable e-mail messages. Some prior attempts at filtering messages are directed to removing "junk mail" by deleting the mail before it goes into the user's in-box. These attempts often are limited in their granularity (e.g., not well adjusted to addressing individual conversations, etc.) when attempting to determine if mail is junk and their scope is also typically limited in regards to dealing with long term filtering of messages. While these traditional message filtering approaches may attempt to prevent a user from receiving e-mails the user did not wish to receive (e.g., unsolicited bulk e-mail or UBE), they do not typically provide a user with the advantageous flexibility of receiving e-mail messages and managing them appropriately (e.g., messages related to an e-mail message conversation or thread).

SUMMARY OF THE INVENTION

A user-friendly, easy to use system and method for flexibly filtering electronic messages in accordance with user objectives is presented. The present invention facilitates the automated development of message management rules corresponding to the user objectives and the performance of a message management action associated with the rules. For example, in one implementation of the present invention assistance is provided in realizing a user objective of filtering electronic mail (e-mail) messages associated with a "conversation" thread. By providing a convenient way for users to indicate message management objectives and automatically executing actions on messages in accordance with automatically generated rules that correspond to the objectives, the time and resources consumed by message management activities (e.g., reading, responding, deleting, etc.) is greatly reduced. A significant flexibility feature of one embodiment of the present invention is the ability for a user to receive a message and then define a management activity on the message and future messages like it. The rules developed to govern the management activities appropriately correspond to the users objectives, direct that the activities are "visible" or traceable, provide for reversibility of the activities, have a lifetime, and evolve over the course of that lifetime.

In one embodiment of the present invention, an electronic message filtering system receives a message, examines characteristics of the message (e.g., the header information such as a sender's name or subject), determines if a rule has been established for messages with the characteristics of the incoming message. If a rule exists the corresponding actions are automatically performed. If a rule does not exist a query is presented to the user inquiring if the user has a desired objective for e-mail messages with similar characteristics. For example, does a user have a wish or objective to delete messages related to the same conversation thread? If the user indicates an objective then a rule for achieving the objective is automatically developed. For example, electronic messages with a particular subject are moved to a "trash" folder, messages from a particular sender appear at the top of the new message list and/or are displayed in a unique color, or a sound will be emitted. In one embodiment the rules have expiration dates.

In one embodiment, the invention allows the user to select a message and set up a filtering objective that will allow the filtering engine to create a rule and perform an action on future messages in a particular conversation thread. For example, a user, Jon has subscribed to a mailing list "pc-interest@somecorp.com". Another user, Bill sends a message to this mailing list with the subject "Movie software for Mac?" Jon does not own a Mac computer and has no interest in movie software. Jon sees the message from Bill and decides that he will delete this message and any replies on this subject. According to one embodiment of the invention, the user selects the message and selects a "delete this conversation" action. The invention automatically creates a rule for the user that will move messages on this subject to a "deleted items" e-mail folder. The rule creation process may be transparent to the user, but users are also able to view rules that have been defined and modify or delete them as desired. When additional messages arrive with the subject "RE: Movie software for Mac?", these messages are automatically moved to the specified "deleted items" folder and the messages do not appear in the user's default "inbox" folder.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 3A is an illustration of a typical graphical display of an electronic mail message containing a subject portion, a sender portion, and a recipient portion.

FIG. 3B is an illustration of an electronic mail message from a user with a different subject.

FIG. 4 is an illustration of a typical user interface of an electronic messaging client showing various folders and a list of new messages.

FIG. 7 is an illustration of a rule database used to store particular electronic message filtering rules in accordance with the present invention.

DETAILED DESCRIPTION OF THE INVENTION

Figure 1A:
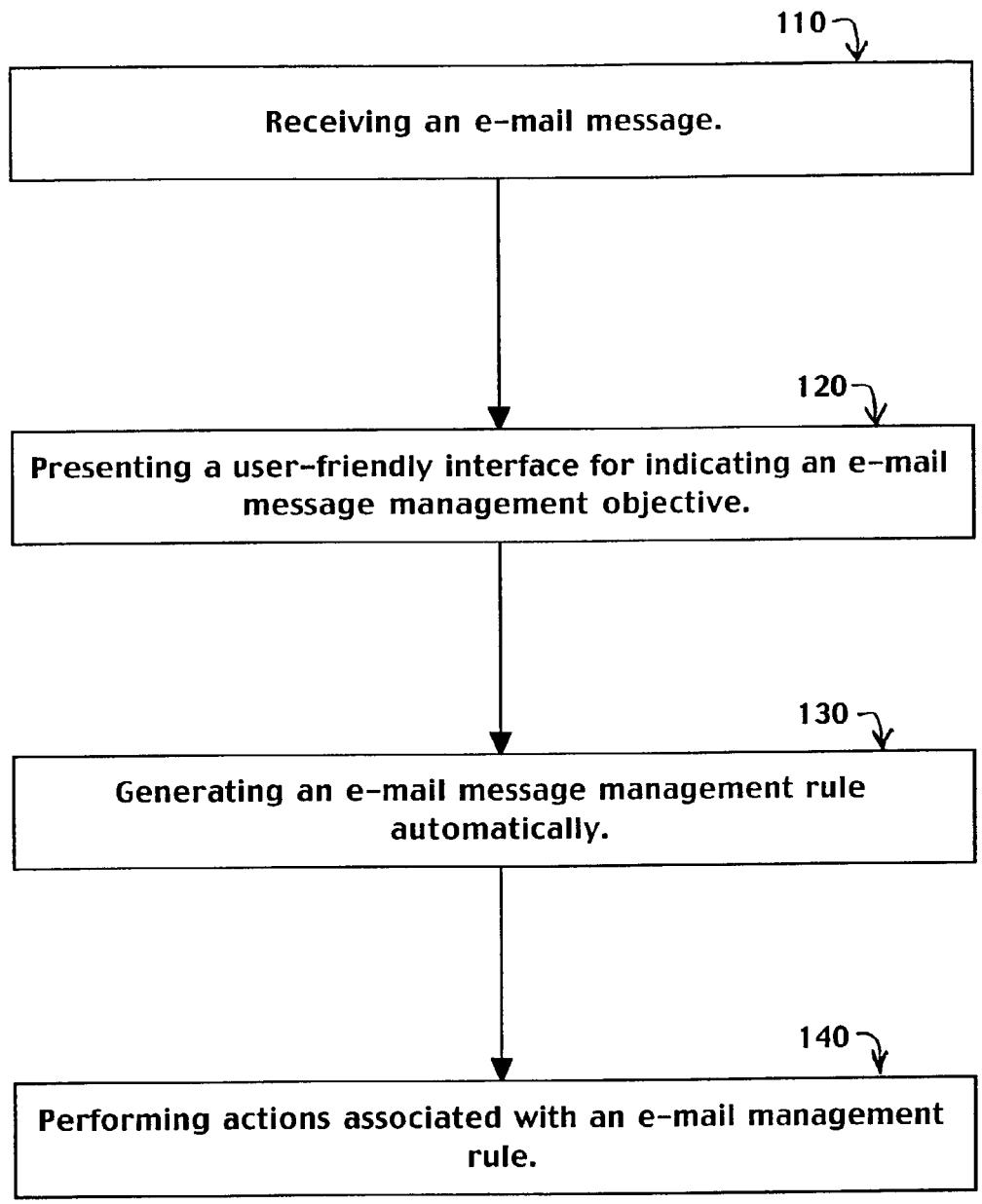
FIG. 1A is a flow chart of an e-mail management process in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes (e.g., processes 500 and 505) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

FIG. 1A is a flow chart of e-mail management process 100, one embodiment of the present invention. E-mail management process 100 facilitates automated e-mail message management. In one embodiment of a present invention, e-mail management process 100 utilizes message management rules that are developed with the assistance of automated processes. For example, a user provides an objective and e-mail management process 100 handles the complex development of appropriate rules for achieving the objective.

In step 110, an e-mail message is received. In one embodiment of the present invention, the email message is received by a personal computer. For example, a user receives an e-mail delivered via the Internet to the user's personal computer. In one exemplary implementation, the e-mail message is part of a conversation thread.

At step 120, a user-friendly interface is presented for indicating an e-mail message management objective. In one exemplary implementation of the present invention, the e-mail management objective includes the removal of e-mail messages associated with a conversation thread. In one embodiment of the present invention, providing the user friendly interface comprises presenting a graphical user interface that questions if a user wishes to receive other e-mails related to a conversation associated with a particular conversation thread.

An e-mail message management rule to achieve the indicated objective is automatically generated in step 130. In one embodiment of e-mail management process 100, the generated rule includes software code instructions produced in a proper syntax for causing a computer system to move e-mails to a predetermined folder if the e-mails have certain characteristics that are associated with the e-mail message management objective. For example, if information in the subject field of an e-mail message contains a specific phrase the e-mail message is deleted.

In step 140 actions associated with said e-mail management rule are performed. In one embodiment of the present invention, performing actions associated with said e-mail management rule includes examining contents of said e-mail messages to determine if said e-mail messages possess characteristics governed by said e-mail message management rule. The e-mail message is moved to a designated folder if said e-mail message possesses characteristics governed by said e-mail message management rule.

Figure 1B:
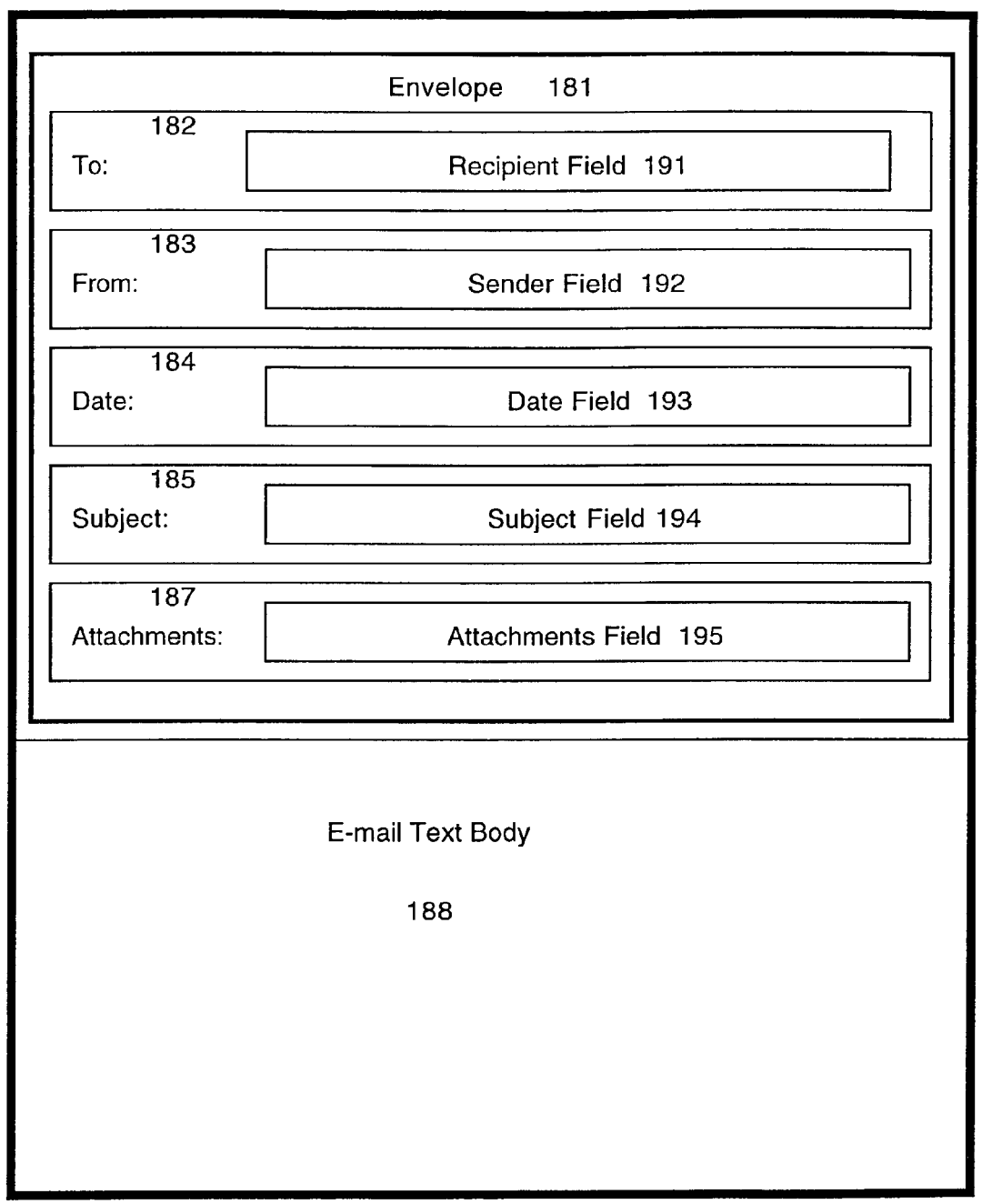
FIG. 1B is a block diagram of one embodiment of an e-mail message managed by the present invention.

FIG. 1B is a block diagram of e-mail message 180, one embodiment of an e-mail message managed by the present invention. E-mail message 180 comprises envelope section 181 and e-mail text body 188. Envelope section 181 includes descriptive information about the e-mail. For example, envelope section 181 includes a recipient block 182 with a recipient field 191, a sender block 183 with sender field 192, a date block 184 with a date field 193, a subject block 185 with a subject field 194, and an attachments block 187 with an attachments field 195. E-mail text body 188 includes the text of the e-mail message body.

Figure 1C:
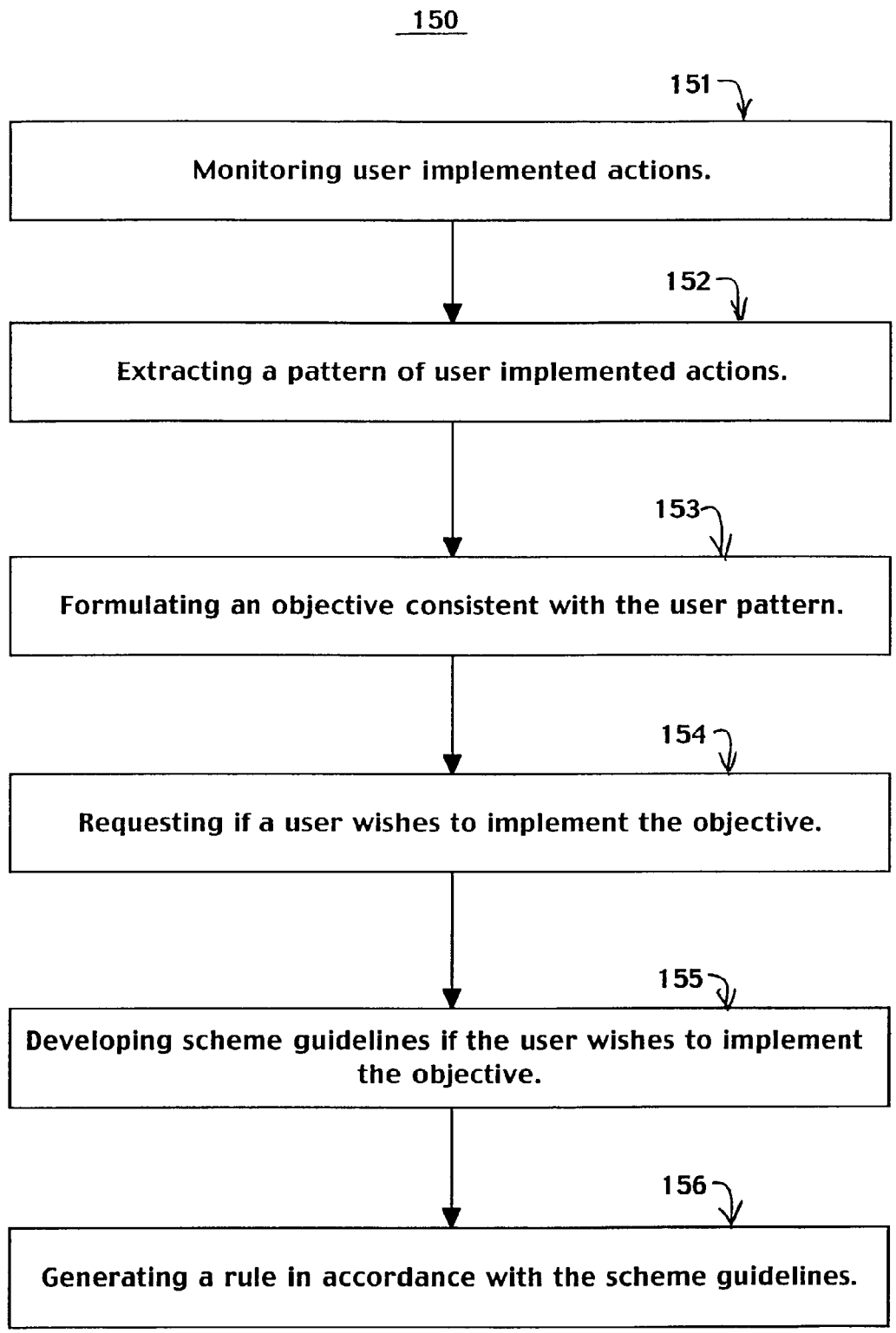
FIG. 1C is a flow chart of an e-mail management process in accordance with one embodiment of the invention that includes extrapolation of user actions when developing rules.

In one embodiment of e-mail management process 100, the e-mail management scheme is automatically refined in another step (not shown) by altering said guidelines for developing said e-mail management rule. FIG. 1C is a flow chart of an e-mail management process 150. In step 151 user actions are monitored. At step 152, a pattern is extracted from the user actions. An objective consistent with the pattern is formulated in step 153. At step 154, a request is made if a user wishes to implement the objective formulated in step 153. In step 155, filtering guidelines are developed if the user wishes to implement the objective. In step 156 a rule is generated in accordance with said filtering guidelines.

Figure 1D:
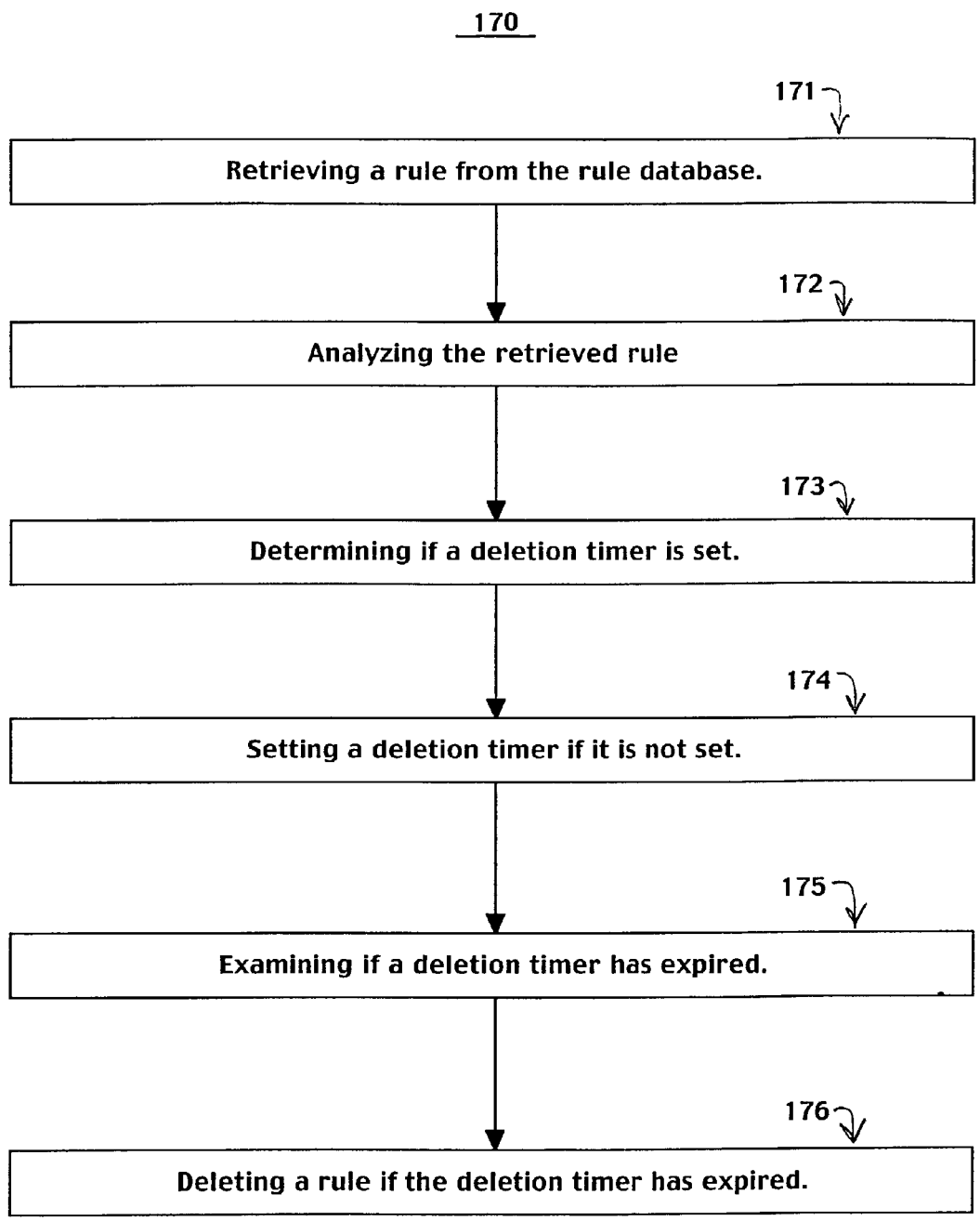
FIG. 1D is a flow chart of an e-mail monitoring process in accordance with one embodiment of the present invention.

In one embodiment of e-mail management process 100, an e-mail rule monitoring process monitors the rules. FIG. 1D is a flow chart of e-mail monitoring process 170 in accordance with one embodiment of the present invention. In step 171, a rule is retrieved from the rule database. The retrieved rule is analyzed in step 172 to determine if the rule has expired. At step 173, a determination is made if a deletion timer was previously set for this rule. In step 174, the deletion timer is set if a deletion timer is not set. An examination is made in step 175 to determine if a deletion timer has expired. The rule is deleted in step 176 if the deletion timer has expired.

Figure 2A:
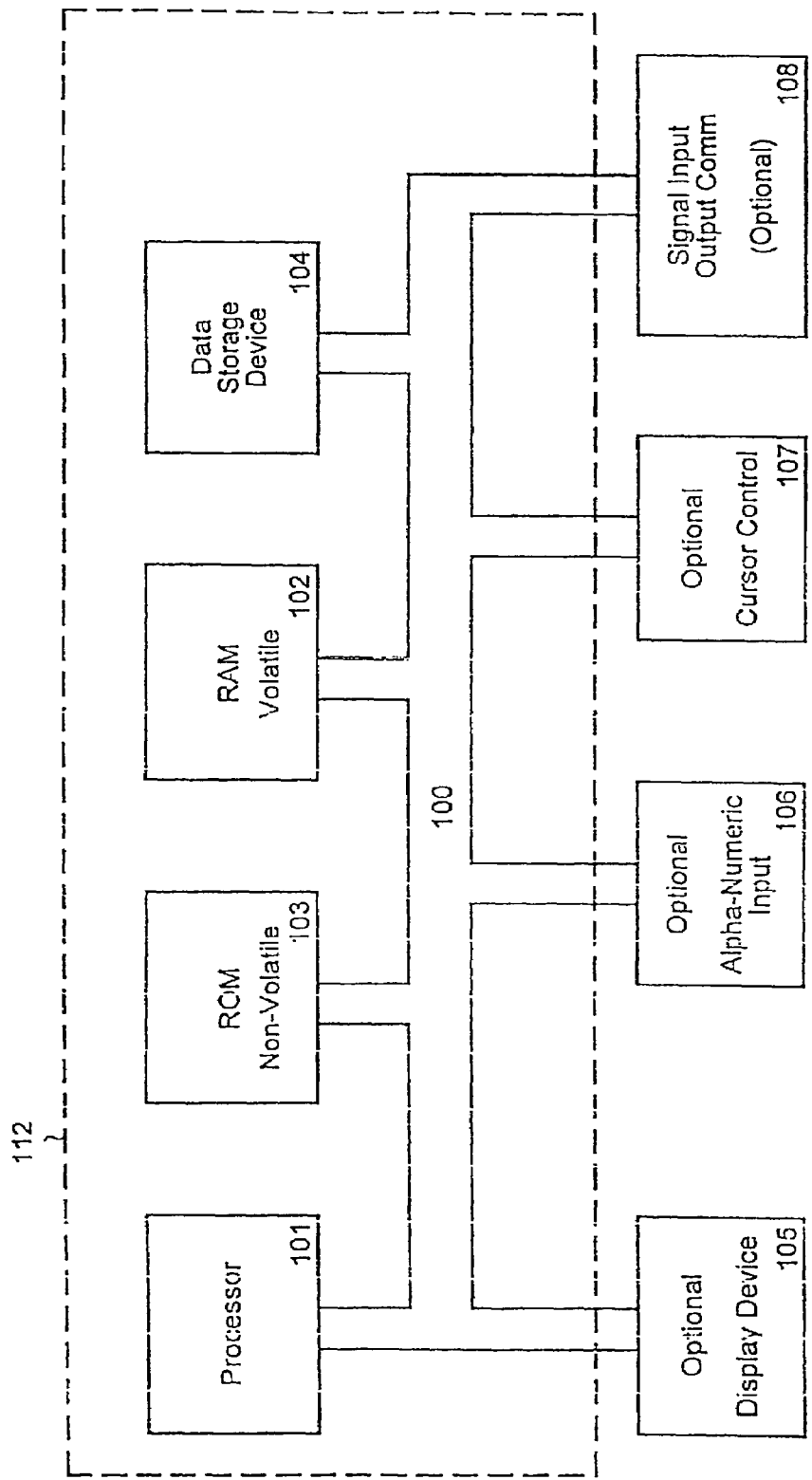
FIG. 2A is a logical block diagram of an exemplary computer system in accordance with an embodiment of the present invention.

Referring now to FIG. 2A, a block diagram of exemplary computer system 112 is shown that may function as a platform for an electronic mail filtering process of the present invention. It is appreciated that an electronic message filtering system of the present invention may be implemented in a variety of different electronic systems (e.g., a pager, a mobile phone, a desktop computing system, a personal digital assistant, etc.) and should be understood that the descriptions corresponding to FIG. 2A provide some general information about an exemplary computing system upon which the present invention can be implemented. Computer system 112 includes an address/data bus 100 for communicating information, a central processor 101 coupled with bus 100 for processing information and instructions, a volatile memory unit 102 (e.g., random access memory, static RAM, dynamic RAM, etc.) coupled with bus 100 for storing information and instructions for central processor 101 and a non-volatile memory unit 103 (e.g., read only memory, programmable ROM, flash memory, EPROM, EEPROM, etc.) coupled with bus 100 for storing static information and instructions for processor 101. Computer system 112 also may contain a display device 105 coupled to bus 100 for displaying information to the computer user. Moreover, computer system 112 may also include a data storage device 104 (e.g., memory stick) for storing information and instructions.

Also included in computer system 112 of FIG. 2A is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 may also include signal communication interface 108, which is also coupled to bus 100, and can be a serial port. Communication interface 108 can also include number of wireless communication mechanisms such as infrared or wireless LAN or for instance, a Bluetooth protocol.

It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention.

Figure 2B:
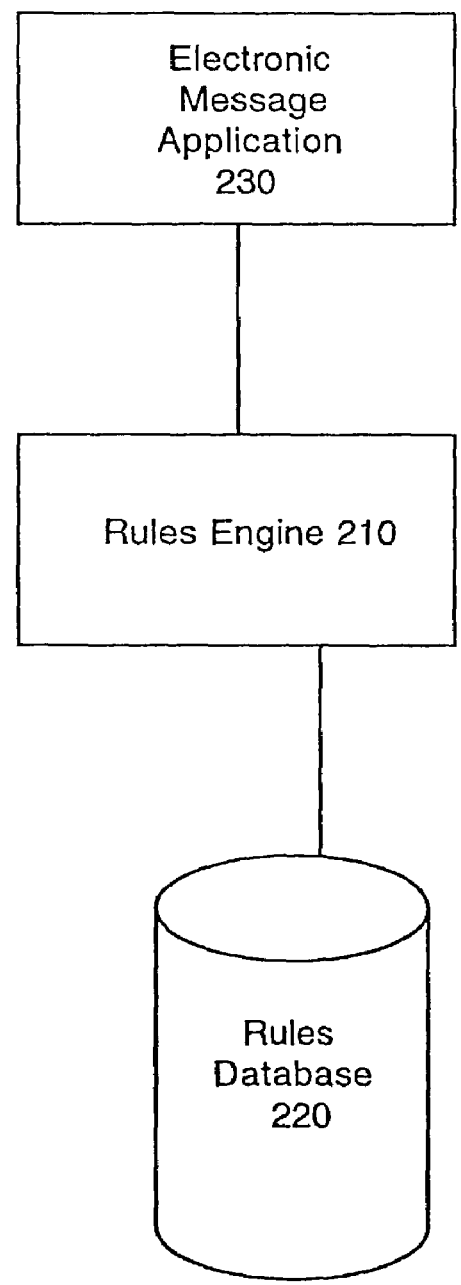
FIG. 2B is a block diagram of computer implemented electronic message processing system 200, one embodiment of the present invention.

FIG. 2B is a block diagram of computer implemented electronic message processing system 200, one embodiment of the present invention. Computer implemented electronic message processing system 200 includes rules engine 210, rules database 220, and electronic message application 230. Rules engine 210 automatically generates rules for governing management of electronic messages. In one exemplary implementation, rules engine 210 automatically generates a rule for recognizing if the electronic message is part of a common message thread. Rules database 220 is coupled to rules engine 210 and stores the rules. Electronic message application 230 accesses electronic messages destined for the user. The electronic message application 230 comprises a first folder and a second folder (not shown) that are utilized to store electronic messages.

In one embodiment of the present invention, the rule defines characteristics of a common message thread and based on the characteristics of the common message thread the rules engine recognizes if the electronic message is part of the common message thread. Rules engine 210 performs an electronic message management action in accordance with the rule. In one exemplary implementation, a first rule-based action is to place an electronic message in the first folder if rules engine 210 recognizes the electronic message is part of a common message thread. A second rule-based action is to place the electronic message in the second folder if rules engine 210 recognizes the electronic message is not part of the common message thread. In one embodiment, the first folder is an electronic mail trash folder and the second box is an electronic mail in-box folder. In addition, a third rule-based action can include associating a visually distinct display attribute with the electronic message. In one exemplary implementation, the rule expires after a period of inactivity.

An embodiment of the present invention allows an electronic message to be selected and a rule to be established that will perform an action on future messages comprising similar attributes of the original message (e.g., related e-mails belonging to a particular thread). In one embodiment of the present invention, the rule engine allows the user to select a message and set up a filtering rule that will perform an action on future messages in that thread. For example, a user Jon has subscribed to a mailing list "pc-interest@somecorp.com". Another user, Bill sends a message to this mailing list with the subject "Movie software for Mac?". Jon does not own a Mac computer and has no interest in movie software. He sees the message from Bill and decides that he will delete this message and any replies on this subject. According to one embodiment of the invention, the user selects the message and selects the "delete this conversation" action. The invention creates a rule for the user that will move all messages on this subject to the deleted items e-mail folder. Now, when a message arrives with the subject "RE: Movie Software for Mac?", this message will automatically be moved to the deleted items folder and the user will not see the message in their in-box.

FIG. 3A is a representation of an exemplary electronic mail message (e.g., electronic message) 310A as it can appear in an e-mail application. In electronic message 200, there is an e-mail text body portion 204, a subject portion 201, a sender address portion 202, and a recipient address portion 203. In this example, the subject 201 is "Get Rich Quick!!." Suppose the user does not find this subject interesting and the desired action is to delete this particular message. An embodiment of the present invention allows a user to select a particular message and select a specified "delete this conversation" action, which prevents messages associated with the particular message subject or "conversation thread" from entering the user's "new message" or in-box folder.

An embodiment of the invention creates a transient rule that moves all messages on the particular subject to a "deleted items" folder. A rule can be established by the rule engine that would delete any incoming electronic messages that contain the subject portion 201 "Get Rich Quick!!" An alternative or additional rule could be to delete any electronic messages that are received with a similar sender portion 202 (e.g., xxx@isp.com). In one embodiment, multiple rules can be established at the same time to handle (filter) messages with different characteristics. Furthermore, a rule can be established that would examine the text body for keywords that would trigger an action on the electronic message. In another embodiment, a rule can be created to move electronic messages to a trash folder if they contain a virus (e.g., located in an attachment).

FIG. 3B is an illustration of an electronic message 310B as it appears in an exemplary e-mail application. Message 320 is similar but different from message 310A of FIG. 3A because the text in the subject portion 201 is slightly different. The subject portion 201 of message 310B reads "Get Rich Fast!!. An embodiment of the present invention can recognize the similarities between the messages and offer to perform the same e-mail filtering objective on electronic message 310B that was established with respect to message 310A. The similarities detected could result from similarities in the text body portion 204, or from the identical sender address portion 202, or because of a partial match of the subject portion 201, or combinations thereof. In one embodiment, the electronic message filter engine can recognize messages containing similar punctuation such as "!!" or "xxx" and can create rules and perform specific actions on those messages that have those specific attributes. The filter engine can easily be configured to look for matches in any combination of subject, sender address, keywords etc., and the sensitivity can be configured to achieve the desired filtering objectives.

In addition to moving messages to specific folders, the filtering engine can be used to flag important messages in a new messages folder of an e-mail application. For example, FIG. 4 illustrates the user interface 400 of a typical electronic messaging client. The interface 400 displays new messages 401, 402, 403, and 404. Below the list of new messages, a specific message can be viewed by selecting the message above. When bombarded with many messages, it is useful to recognize important messages quickly. An embodiment of the present invention can be configured to make important messages easily recognized by the user in the "new messages" folder. For example, the filtering engine can be configured to display messages from a particular sender 201 in a different color from the other new messages. Suppose all messages from a particular source (e.g., "mom@isp.com") are important messages and you want to recognize them quickly. In one embodiment, the rule engine can create a rule to cause messages from the particular source (e.g., "mom@isp.com") to appear at the top of the new message list or in a visually distinct manner (e.g., flashing or in a different color than other lesser important messages).

Figure 5:
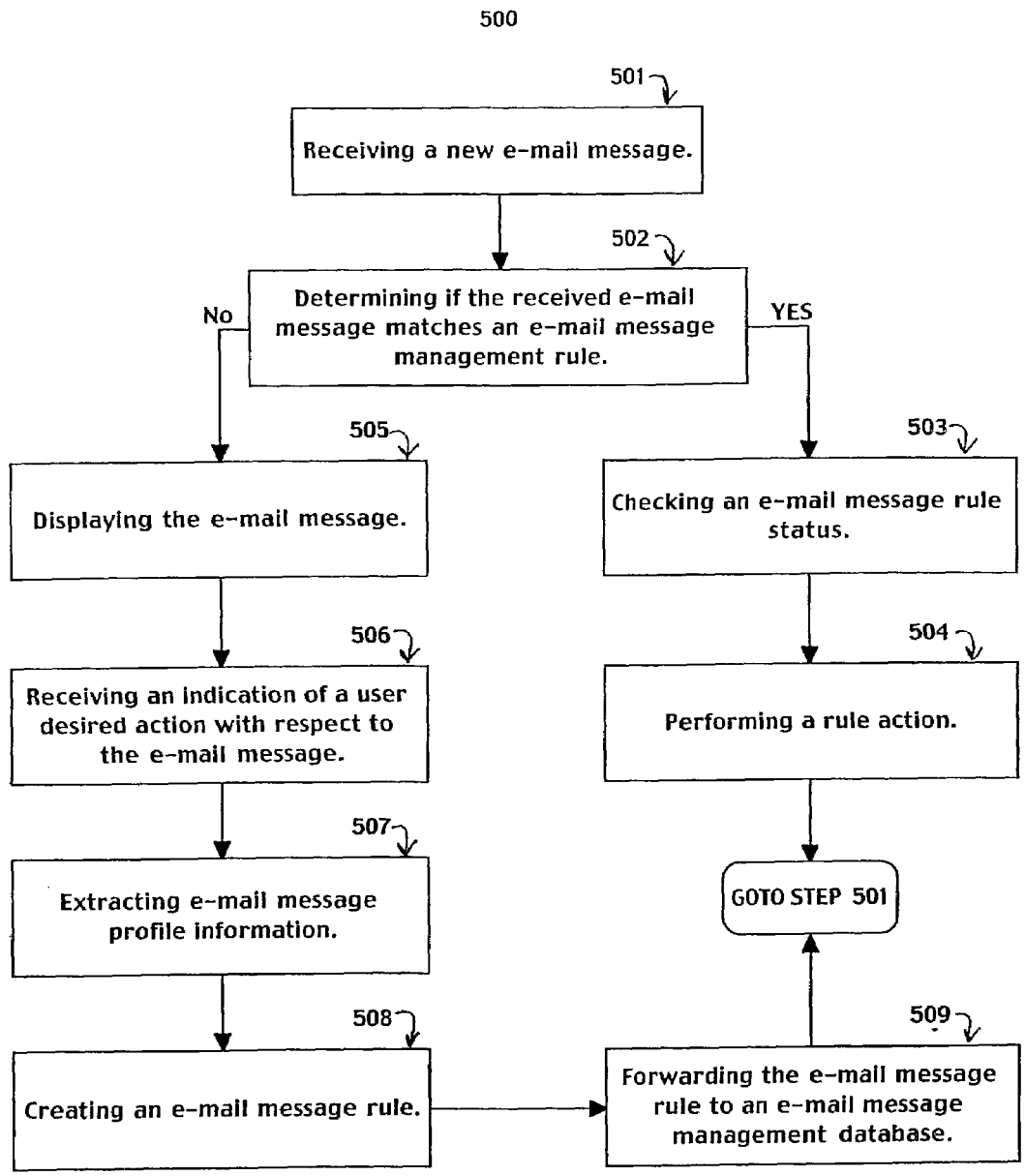
FIG. 5 is a flow diagram illustrating steps in a filtering process for an electronic message in accordance with the present invention.

FIG. 5 is a computer implemented flow diagram 500 illustrating the steps performed when filtering electronic messages in accordance with the present invention.

In step 501, an e-mail message is received. In one embodiment of the present invention, an e-mail message is received by a personal computer. For example, a user receives an e-mail delivered via the Internet to the user's personal computer. In one exemplary implementation, the e-mail message is part of a conversation thread.

In step 502, a determination is made if an e-mail message management rule applies to the received e-mail message. In one embodiment of the present invention, determining if a rule exists includes examining contents of the e-mail message and determining if the e-mail message possesses characteristics governed by an e-mail message management rule. In one embodiment, a database is searched for rules that apply to characteristics of the e-mail. For example, a rule might match because the message characteristics indicate that the message belongs to a conversation thread. If no e-mail message rules apply to the received e-mail message then the process jumps to step 505. If an e-mail message rule applies to the received e-mail message then the process proceeds to step 503.

Figure 6:
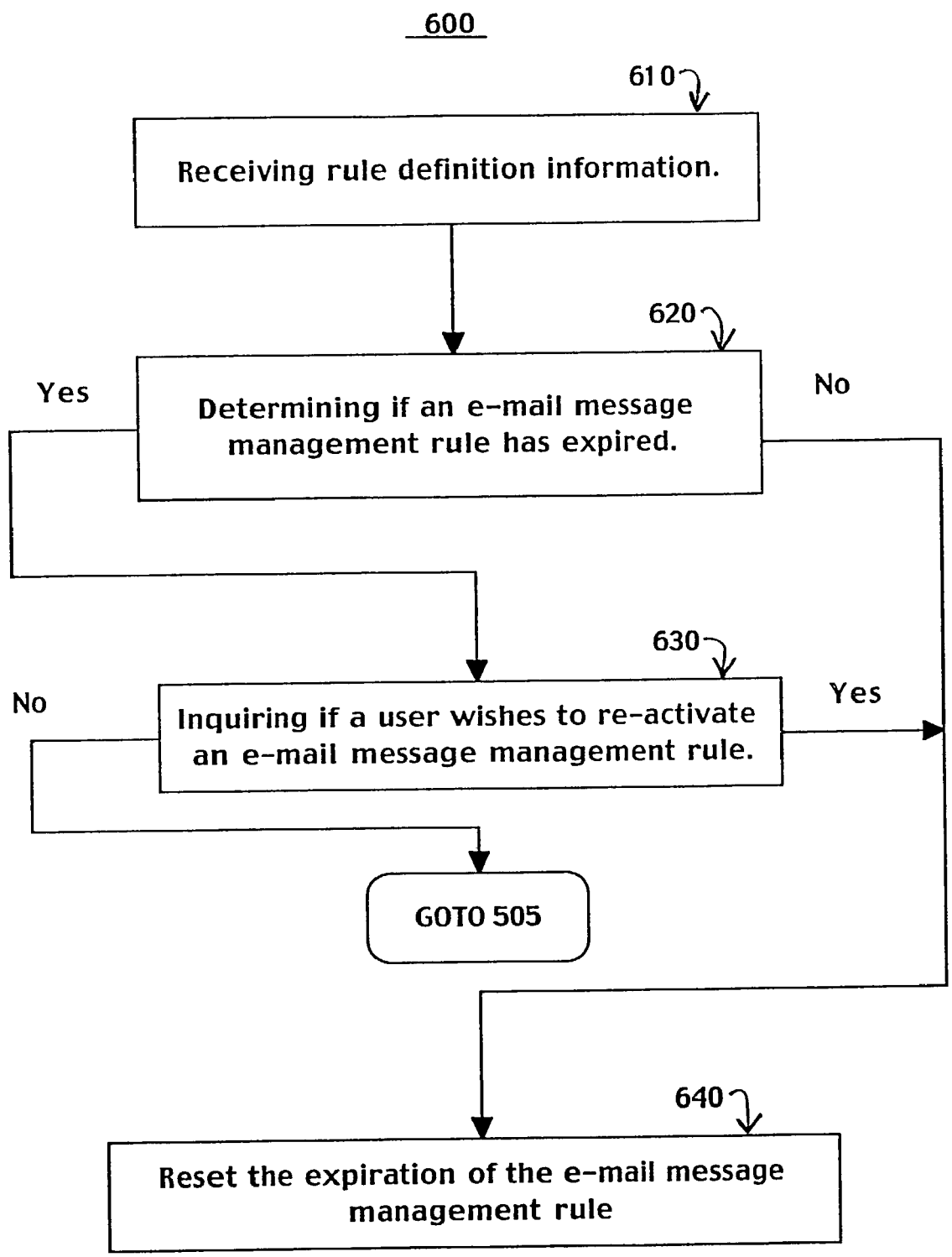
FIG. 6 is a flow chart of one embodiment of the present invention showing the e-mail message management rule status checking process.

The status of the e-mail message management rule is checked at step 503. In one embodiment of the present invention, a rule status checking process is applied to an e-mail message management rule. FIG. 6 is a flow chart of e-mail message management rule status checking process 600, one embodiment of a present invention e-mail message management rule status checking process. In step 610, rule definition information is received. At step 620, a determination is made if the e-mail message management rule has expired. If the e-mail message management rule has not expired process 600 jumps to step 640. If the e-mail message management rule has expired process 600 proceeds to step 630. In step 630, an inquiry is made is a user wishes to re-activate the e-mail message management rule. If a user does not wish to re-activate the e-mail message management rule process 600 returns control to a display step (e.g., 505). If a user does wish to re-activate the e-mail message management rule process 600 proceeds to step 640. At step 640, the expiration of the e-mail message management rule is reset (e.g., for another 2 weeks).

Referring again to FIG. 5, an action of a corresponding e-mail message management rule is performed at step 504. In one exemplary implementation, the e-mail message is "moved" to a designated "location" (e.g., a folder) if the e-mail message possesses characteristics governed by the e-mail message management rule. After performing a rule action the process proceeds to step 501.

In step 505 the e-mail message is displayed. FIG. 1B is one exemplary implementation of an e-mail message display.

At step 506, an indication of a user desired action is received. In one embodiment of the present invention, a user desired action is specific to a particular message (e.g., indicates a desire to delete the particular message). In one exemplary implementation, the indication of a user desired action is expressed in terms of an objective applicable to a plurality of messages (e.g., a user indicates the desire to delete messages associated with a conversation thread).

E-mail message profile information is extracted in step 507. In one embodiment of the present invention, the E-mail message profile information includes information about the sender, the recipients, conversation, sent date, etc. The profile information is stored in a message profile database in one exemplary implementation.

In step 508 an E-mail message rule is created. After the E-mail rule is created the rule action is implemented. In one embodiment of the present invention, the appropriateness of the rule is checked by asking a user if first execution of a rule action achieved the desired result. If it did not provisions are made to change the rule action.

In one embodiment of the present invention, the rule generating algorithms follow a rule development schema or guideline. In one implementation, a rule development schema directs generation of an appropriate filtering rule by indicating that rules for deleting a conversation thread should examine a header field value of new e-mail messages and perform an action on messages with a corresponding header field value. For example, one schema directs development of a rule that instructs a rule engine to check a message envelope and determine if the message was sent directly to the user (e.g., if the "To:" and "Cc:" message header fields do not contain the user's e-mail address a determination is made that the message was not sent directly to the user). So, as a result, the engine creates a rule that looks instead in the subject field for a matching value (e.g., for the exact phrase "Movie software for Mac?") and moves only the messages with matching values into a specified folder (e.g., a "deleted items" folder). Note that this rule is not blocking all messages from a user (e.g., Bill) or all messages sent to a mailing list (e.g., the "pc-interest@somecorp.com" mailing list).

In the present example, the rule does not take an action if the recipient is directly addressed. For example, if someone on the mailing list replies to a message and copies the recipient directly using their e-mail address, the recipient is now explicitly pulled into the conversation that the recipient chose to ignore earlier. The rule does not move this new message to the specified "deleted items" folder, but leaves it in the user's "inbox" folder. The rule engine knows that e-mail messages that directly mention the user should not be filtered. In one example, the user sees the new message and sends a reply to the addressees. This action starts a sub-conversation that includes the original recipients and the user. The user can receive messages that include him and also messages from anyone that replies to the messages (e.g., using a specified "reply to all" function in an e-mail client).

In one embodiment of the present invention, the rule schema dictates that rule activity should be "visible" or traceable by the user. For example, users should be able to "see" the actions of the rules that have been set up. So in the case of deletion, the message is not deleted, but moved into a specified "deleted items" folder which the user can open and view. In one exemplary implementation of the present invention, the rule schema dictates that rule activity should be reversible. For example, the user should be able to undo the action performed by the rule engine. In the present example, a user may realize that he should have read the conversation (e.g., the "Movie software for Mac?" conversation) and should be able to disable or delete the rule that was previously created.

In one embodiment of the present invention, the rule schema indicates that a rule has a lifetime. For example, a conversation may last for hours or days, but typically not for weeks or months. In one embodiment of the present invention, the rule engine monitors activity of a conversation. After a specified period of inactivity (e.g., no messages received on this conversation thread in a given period of time) the rule engine will attempt to delete the rule. In one embodiment of the present invention, the rule is first subjected to another specified period of time during which it is disabled pending deletion. If the rule is not triggered during the period for which it is disabled, the rule is deleted at the expiration of this period.

In one embodiment of the present invention, the rules schema or guidelines direct evolvement of the created rules in step 508 of FIG. 5. For example, in another scenario, a user (e.g., Jon) receives unsolicited e-mail from particular sender (e.g., "Dave Smith"). The user does not know the particular sender and indeed the message dealing with a particular subject (e.g., "Get rich quick!!!") is junk e-mail. The user simply deletes the message, but now the rule engine is monitoring for messages from that particular sender (e.g., "Dave Smith") and/or messages with the same subject (e.g., "Get rich quick!!!"). In one implementation, the user later receives another message from the particular sender (e.g., "Dave Smith") with a different subject (e.g., "Free Money!!!"), and the user deletes this message. The rule engine gives the user the option of always deleting messages from the particular sender (e.g., "Dave Smith"). If the user chooses to delete all messages from the particular sender and later the particular sender (e.g., "Dave Smith") sends a message with a different subject (e.g., "Secrets of the rich and famous!!!"), the message will be automatically deleted by the rule created by the rule engine. Furthermore, the filtering engine monitors incoming messages and the corresponding actions of the user and detects common actions such as always deleting but not reading e-mail messages from a particular sender. A rule is developed and similar actions are automatically performed in the future.

Referring still to FIG. 5, the e-mail message rule is forwarded to an e-mail message management database in step 509. After performing step 509 the process returns to step 501.

FIG. 7 is an illustration of a rule database specified in step 509 of FIG. 5. The rule database stores the rule definitions for the various rules that are created. It is important that the rule database be accessible to a user to ensure the rules can be easily monitored or deleted if the desired actions are not performed. In addition to modifying rules, the actions performed on incoming electronic messages can be reversed. For example, if a message was deleted, it could be recovered by reversing the action performed on the message. All of the actions performed on incoming messages are made visible to the user to assure the user that important messages are not lost.

Figure 8:
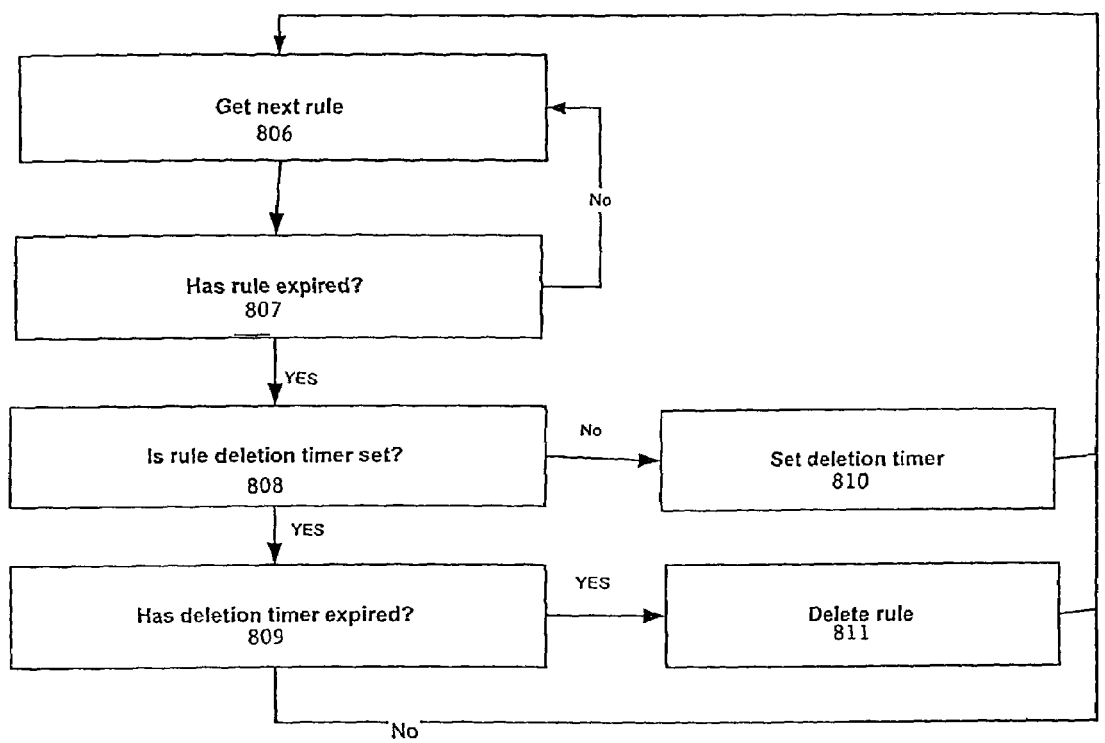
FIG. 8 is a flow diagram of steps a filtering engine performs to manage the set of active rules in accordance with an embodiment of the present invention.

FIG. 8 is a flow diagram 800 of how the rule engine of one embodiment of the present invention implements and monitors particular rules. In one embodiment the user can edit the rules to accomplish desired actions. In one implementation, rules have an expiration timer that ensures old irrelevant rules are not active. For example, the first step 806 is to retrieve a rule from the rule database. In the next step 807, the rule engine checks if the rule has expired. In one example, a rule will expire after a predetermined period of time if the rule has not been triggered by messages. If the rule is used on a continual basis, this activity prevents an active rule from expiring. If a rule is dormant for a long period of time (e.g., one month) the rule expires and is not applied to messages. In one embodiment, the expiration of dormant rules can be customized such as in step 808 of FIG. 8. In this step, the rule engine checks if there is an expiration timer defined for a particular rule. If no deletion timer is set for a particular rule, the engine will set a time period for deletion in step 810. In one embodiment, there is a default timer set for all rules. If there is a deletion timer set for a particular rule, the engine checks if the timer has expired at step 809 and if the timer has expired the rule is deleted in step 811. In one embodiment, the expired rules can be re-activated if desired.

Figure 9:
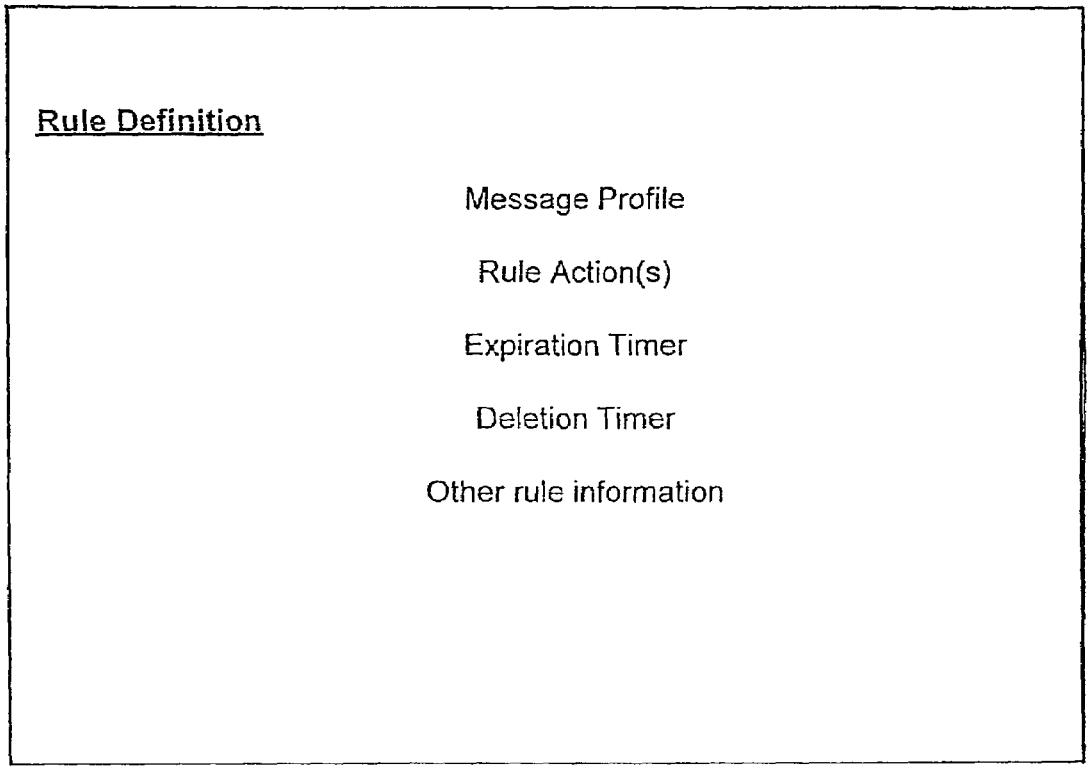
FIG. 9 is an illustration of a rule definition used to filter incoming electronic messages in accordance with an embodiment of the present invention.

FIG. 9 is an illustration of an exemplary rule definition included in the rule database. A rule definition can have many attributes such as a key message attribute, a deletion timer and an associated action. The rule definition can be customized to achieve results corresponding to a user objective. In another embodiment, the rule engine modifies the rules by examining characteristics of the message and corresponding user actions, then suggesting a rule for user approval (e.g., presented to the user in plain text instead of software code). For example, referring back to FIG. 3A, the subject 201 of the message reads "Get Rich Quick!!." In FIG. 3B, the subject 201 reads "Get Rich Fast!!." If rules are created to delete messages containing these different subject headings, the filtering engine will recognize the two messages are from the same sender 202 "xxx@isp.com" and will suggest a rule that deletes messages from the sender "xxx@isp.com". In one embodiment, the engine will have the sensitivity to recognize that both subjects have "!!" in the subject and will suggest a rule that deletes messages with "!!" in the subject portion 201.

In one embodiment, the user approves rules that are created by the engine. When the engine detects similarities between rules, or suggests a new rule, the engine prompts the user for approval of the new rule. In one embodiment, a rule activity log is stored so the user can keep track of the rule activity. If a rule does not perform as expected, the rule can be edited or deleted. In addition, if an action was undesirable, the action can be undone. As a result, the chance for lost messages is minimized.

Embodiments of the present invention, a computer implemented system and method of predictive management of electronic messages, have been described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for managing messages within an e-mail application comprising:
   monitoring a plurality of actions performed by a user of the e-mail application to identify a pattern;
   formulating a message management objective for processing messages based on the pattern;
   creating a rule definition consistent with the message management objective, wherein messages within the e-mail application are automatically processed based on the rule definition, wherein the rule definition comprises a rule expiration timer and a rule deletion timer; and
   removing the rule definition when the rule deletion timer expires,
   wherein identifying the pattern comprises identifying a commonly performed action on messages having a similar characteristic within the e-mail application, and
   wherein messages are automatically processed by executing the commonly performed action on messages having the similar characteristic.

2. The method of claim 1 wherein the rule definition comprises:
   a message profile; and
   the commonly performed action.

3. The method of claim 2 further comprising:
   executing the commonly performed action.

4. The method of claim 1 further comprising:
   deactivating the rule definition when the rule expiration timer expires.

5. The method of claim 1 further comprising:
   selecting to enforce the rule definition within the e-mail application based on user input.

6. The method of claim 1 wherein the commonly performed action comprises:
   moving messages to a designated folder.

7. A message management system executing on a computer system comprising a processor, the message management system comprising:
   an e-mail application;
   a rule database; and
   a rule engine configured for:
      monitoring a plurality of actions performed by a user of the e-mail application to identify a pattern;
      formulating a message management objective for processing messages based on the pattern;
      creating a rule definition consistent with the message management objective, wherein messages within the e-mail application are automatically processed based on the rule definition, wherein the rule definition comprises a rule expiration timer and a rule deletion timer;
      storing the rule definition in the rule database; and
      removing the rule definition from the rule database when the rule deletion timer expires,
      wherein identifying the pattern comprises identifying a commonly performed action on messages having a similar characteristic within the e-mail application, and
      wherein messages are automatically processed by executing the commonly performed action on messages having the similar characteristic.

8. The message management system of claim 7 wherein the rule definition comprises:
   a message profile; and
   the commonly performed action.

9. The message management system of claim 8 wherein the rule engine is further configured for:

executing the commonly performed action.

10. The message management system of claim 7 wherein the rule engine is further configured for:

deactivating the rule definition when the rule expiration timer expires.

11. The message management system of claim 7 wherein the rule engine is further configured for:

selecting to enforce the rule definition within the e-mail application based on user input.

12. A computer readable medium with software instructions stored thereon to:

monitor a plurality of actions performed by a user of an e-mail application to identity a pattern;

formulate a message management objective for processing messages based on the pattern;

create a rule definition consistent with the message management objective, wherein messages within the e-mail application are automatically processed based on the rule definition, wherein the rule definition comprises a rule expiration timer and a rule deletion timer; and remove the rule definition when the rule deletion timer expires, wherein identifying the pattern comprises identifying a commonly performed action on messages having a similar characteristic within the e-mail application, and wherein messages are automatically processed by executing the commonly performed action on messages having the similar characteristic.

\* \* \* \* \*